United States Patent [19]

Michaud et al.

[11] 4,208,796

[45] Jun. 24, 1980

[54] GAGE FOR DIRECT INTERNAL MEASUREMENT

[75] Inventors: Orean E. Michaud, Bristol; George F. Kindl, Newington, both of Conn.

[73] Assignee: Colt Industries Operating Corp. (Pratt & Whitney Machine Tool Division), West Hartford, Conn.

[21] Appl. No.: 14,310

[22] Filed: Feb. 23, 1979

[51] Int. Cl.² .............................................. G01B 7/02
[52] U.S. Cl. ................................ 33/143 L; 33/147 E;
33/147 G; 33/147 K; 33/147 M; 33/147 N;
33/199 B
[58] Field of Search ............. 33/143 L, 147 E, 147 G,
33/147 J, 147 K, 147 M, 147 N, 159, 163, 166,
178 E, 199 B

[56] References Cited

U.S. PATENT DOCUMENTS

| | | | |
|---|---|---|---|
| 2,448,106 | 8/1948 | Mannerbrink et al. | 33/147 M |
| 2,863,221 | 12/1958 | Toubhans | 33/147 E |
| 3,190,009 | 6/1965 | Zagar | 33/166 |
| 3,197,873 | 8/1965 | Aller | 33/147 N |
| 3,996,669 | 12/1976 | Anichini | 33/147 N |
| 4,103,427 | 8/1978 | Ledley | 33/166 |

FOREIGN PATENT DOCUMENTS 588350  5/1947  United Kingdom ................. 33/147 N

OTHER PUBLICATIONS

Pratt & Whitney, Publication No. G2301-1, "Trans-O-Limit Universal Internal Comparator Model B-4", 1967.
Pratt & Whitney, Publication No. G2103-1, "Digital English/Metric Electrolimit Supermicrometer Model C", 3-1979.

Primary Examiner—Richard R. Stearns
Attorney, Agent, or Firm—Radford W. Luther; Richard A. Dornon

[57] ABSTRACT

An internal gage has a measuring assembly with two gaging fingers for contacting the part to be measured. One gaging finger is mounted upon a carriage driven by a precision screw assembly and the other gaging finger is mounted upon a platform supported by reeds and may be moved to various stations along the platform. The screw assembly is operatively connected to an incremental position transducer having a digital readout. The platform is associated with an electromechanical transducer connected to a zero meter. The measuring assembly is mounted upon a vertically movable support so that the internal dimensions of tapered parts may be ascertained. In addition, the fingers may include floating elements to enable the measurement of pitch diameters.

4 Claims, 23 Drawing Figures

GAGE FOR DIRECT INTERNAL MEASUREMENT

BACKGROUND OF THE INVENTION

This invention relates to measuring instruments and more particularly to measuring instruments adapted to measure internal dimensions to a high degree of accuracy.

Various instruments are presently available for the determination of internal dimensions. Such instruments include: inside calipers; inside hand micrometers; master gage plugs; air gage plugs; and electronic internal comparators. The calipers and micrometers, while being exceedingly convenient, are not inherently capable of furnishing readings to a high level of accuracy. Master gage plugs (go and no-go) do not yield a direct measurement and their reliability is to a large extent dependent upon the skill and experience of a user. Air gage plug measurements, which are very accurate, mandate the provision of a separate air gage plug and gaging master (since it is a comparative type instrument) for each size being measured. The electronic internal comparator is extremely accurate but must be set-up for each size being measured. While this latter-mentioned instrument is well-suited for master gage rings, it is not readily usable for random measurements of precision parts. In addition, such electronic internal comparators do not have the capability of measuring internal pitch diameters.

SUMMARY OF THE INVENTION

The invention provides an internal gage which is capable of providing direct readings within a predetermined measuring range without the further utilization of a master.

In a gage of the invention, the measuring assembly comprises a pair of gaging fingers respectively mounted on a slideably mounted carriage and a reed mounted platform. The carriage is driven by a precision drive, such as a precision screw assembly, connected to an incremental position transducer, such as a rotary shaft encoder with a digital readout. In addition, a measuring device (e.g., a bridge circuit arrangement) is employed to establish a reference position for the platform with respect to its mounting structure. When the gaging fingers are precisely positioned by a master and the reference position for the platform is established, dimensions of a part, within the range (e.g., one inch) of the precision drive, can be directly measured by actuating the precision drive until the reference position is re-established and then reading the output of the incremental position transducer.

A gage of the invention may also include gaging fingers having floating elements to permit the accurate direct measurement of internal pitch diameters, which has heretofore been unattainable. Moreover, a gage of the invention may provide for relative vertical movement between the fingers and the part being measured, whereby the dimensions of a tapered part can be ascertained. A gage of the invention may additionally incorporate a means to adjust gaging pressure, whereby that pressure deemed most desirable for accurate measurements can be set.

Another feature of the invention is a longitudinally floating and cross-sliding work table which allows for proper positioning of the work table with respect to the gaging fingers. This feature enables an operator to conveniently position a part to be measured without handling the part once it has been placed upon the table.

Accordingly, it is a primary object of the invention to provide a direct reading internal gage.

It is another object of the invention to provide an internal gage capable of measuring pitch diameters.

These and other objects and advantages of the invention will become more readily apparent from the following detailed description when taken in conjunction with the accompanying drawings, in which:

DETAILED DESCRIPTION OF PREFERRED EMBODIMENT

Figure 1:
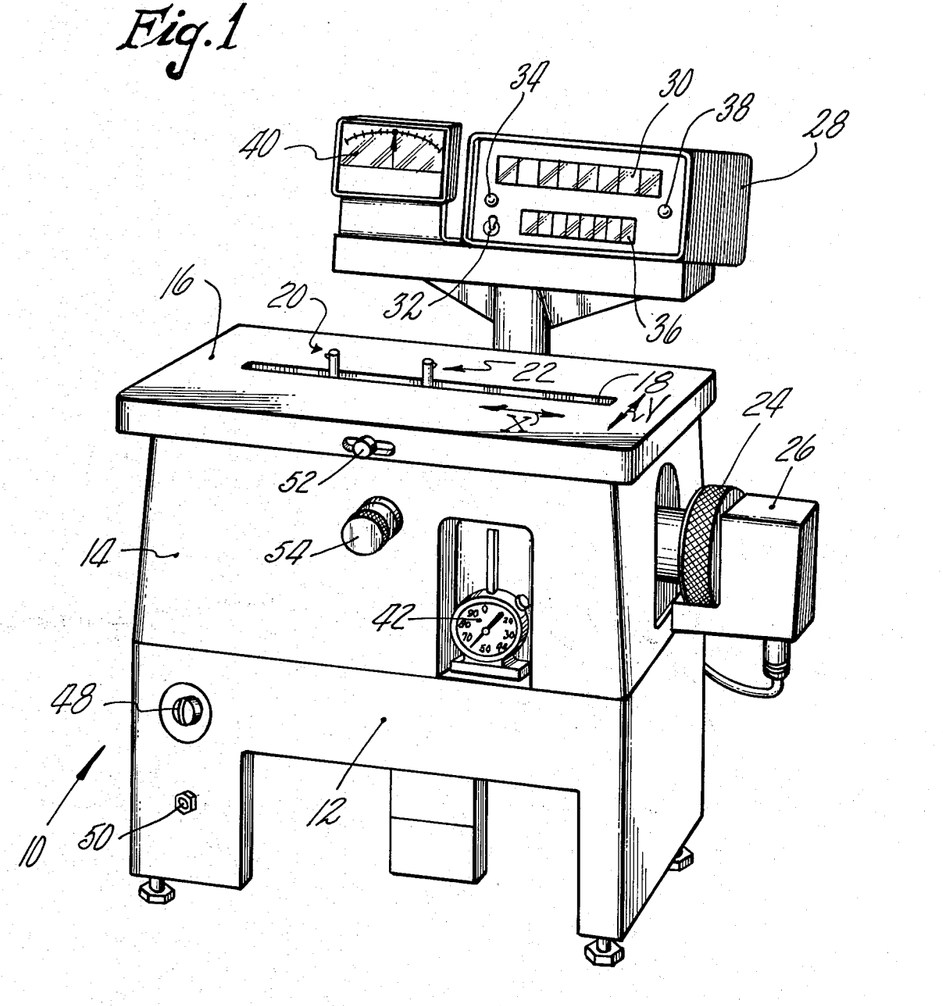
FIGS. 1, 2, and 3 are respectively perspective, front, and side elevational views of an internal gage according to the invention.
Figure 2:
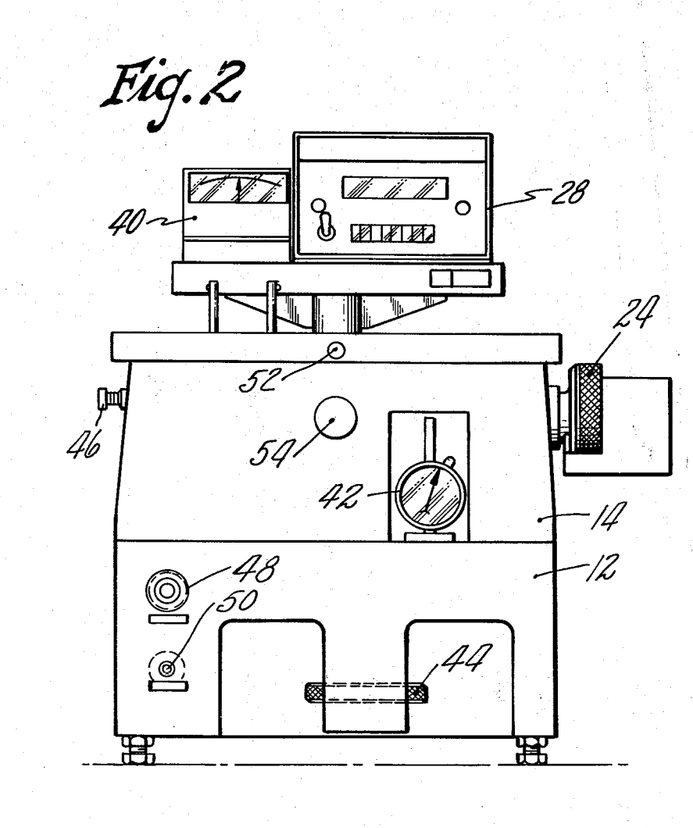
Figure 3:
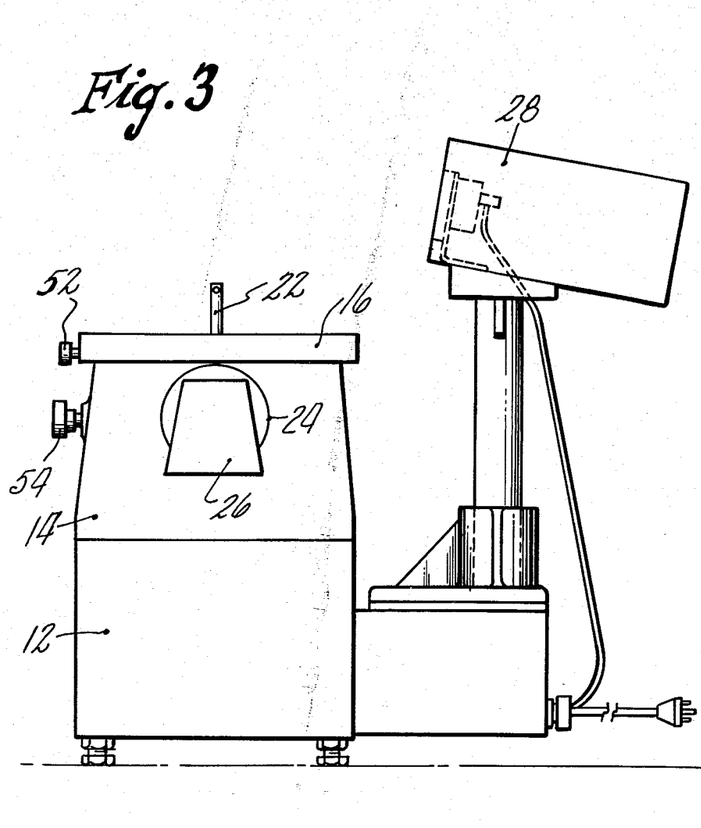

Referring to FIGS. 1, 2, and 3, there is shown a preferred embodiment of a gage according to the invention adapted to provide direct internal measurement over a range from 0.250 to 10 inches. The gage comprises a housing, generally shown at 10, which is generally constituted a lower casing 12 which supports and upper casing 14. Carried upon the upper casing 14 is a work table 16, upon which is placed the part whose internal dimensions are to be measured. Projecting upwardly through a laterally extending slot 18 in the work table 16 are the upper extremities of a pair of gaging fingers 20 and 22. Finger 20 is adapted to be laterally positioned up to one inch by a wheel 24 connected to a shaft encoder 26 which generates discrete pulses (e.g., 100,000 pulses per inch) as the wheel 24 is turned. The finger 22, which is reed mounted and positionable with respect to its platform, can only move a limited lateral distance in unison with its platform.

A digital display unit 28 counts the pulses generated by the encoder 26 and furnishes a reading at window 30 in terms of English or metric units as determined by the position of unit switch 32. The digital display 28 also embodies a preset button 34 which causes the number loaded by an operator into a preset switch array 36 to be shown in the window 30. A zero set button 38 may be employed to set the digital display at a zero reading. Such digital displays are presently commercially available.

An analog meter 40 (or zero center meter) depicts the position of the platform which carries the finger 22 with respect to a reference position. The meter 40, of course, responds to movements of finger 22 and, therefore, establishes the reference point of measurements.

A dial indicator 42 displays the vertical position of the fingers as is made by the turning of a vertical adjustment wheel 44. This adjustment allows for the determination of various internal dimensions at different vertical stations of a part.

The gage is also provided with certain other adjusting controls which extend through the housing 10. For example, gage pressure control 46 (FIG. 2) controls the spring bias exerted upon the platform of finger 22 and, hence, the gaging pressure. Zero knob 48 functions to position the pointer of the analog meter 40. The magnification screw 50 is adapted to vary the sensitivity of the analog meter 40. Finally, the work table 16 can be locked against lateral floating by table lock knob 52 and moved forwardly and rearwardly by table adjustment knob 54.

Figure 4:
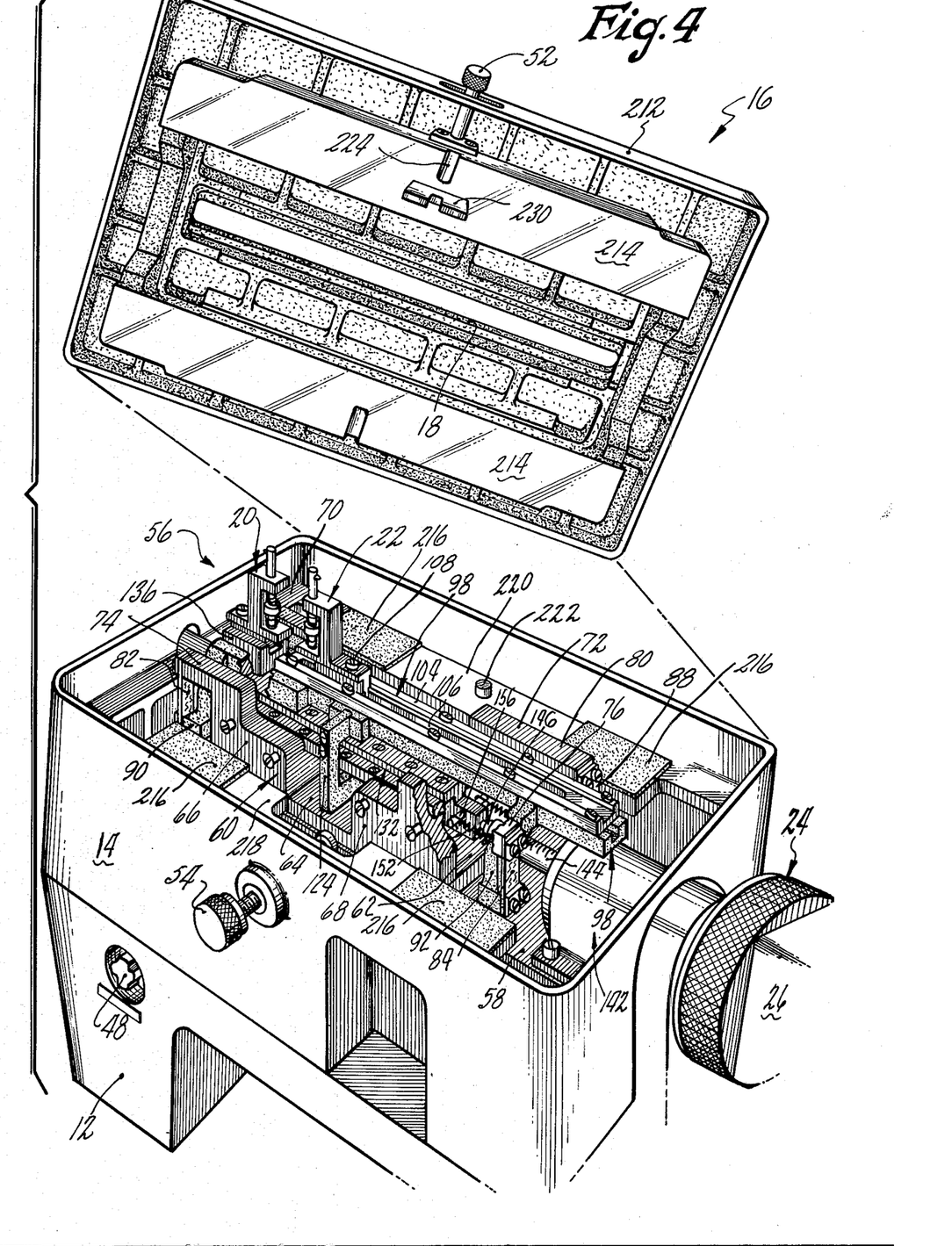
FIG. 4 is a perspective view of the gage with the work table removed therefrom so as to expose the measuring assembly.
Figures 5, 8:
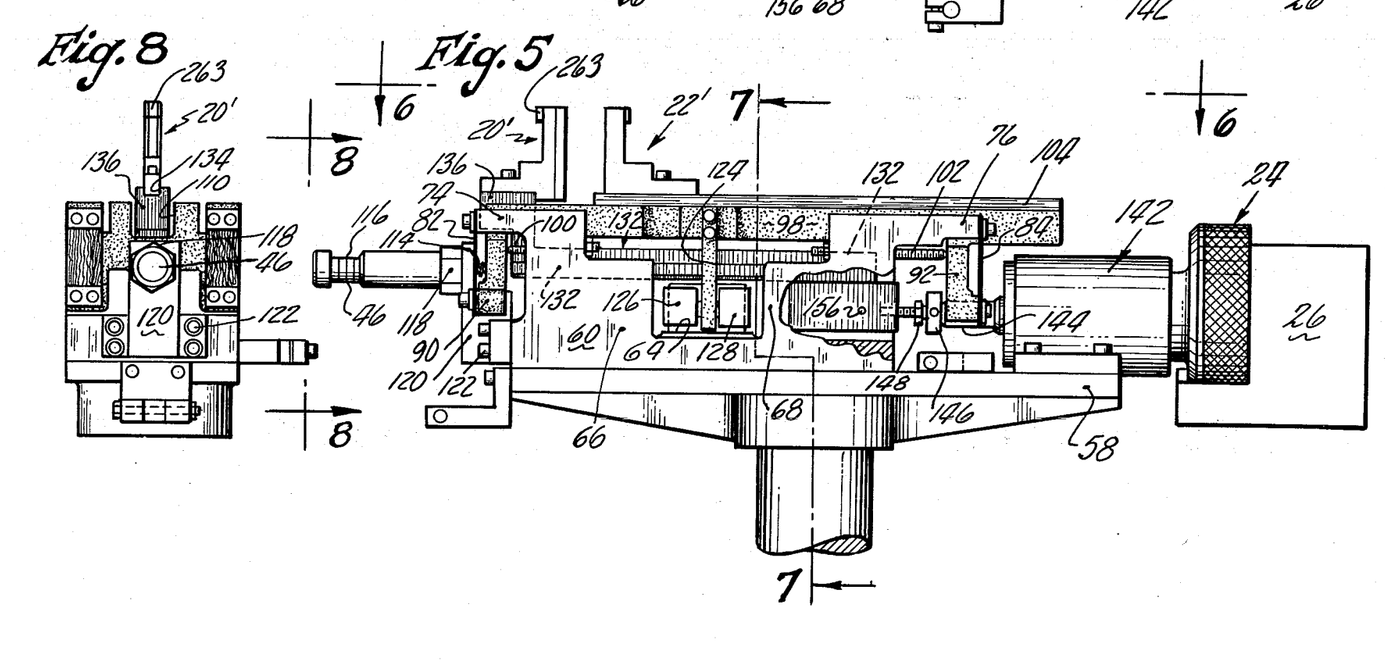
FIG. 5 is a front elevational view of the measuring assembly and its vertically movable support.
FIGS. 7 and 8 are respective side elevational views of the measuring assembly of FIG. 5, taken along the lines 7—7 and 8—8 thereof.
Figure 6:
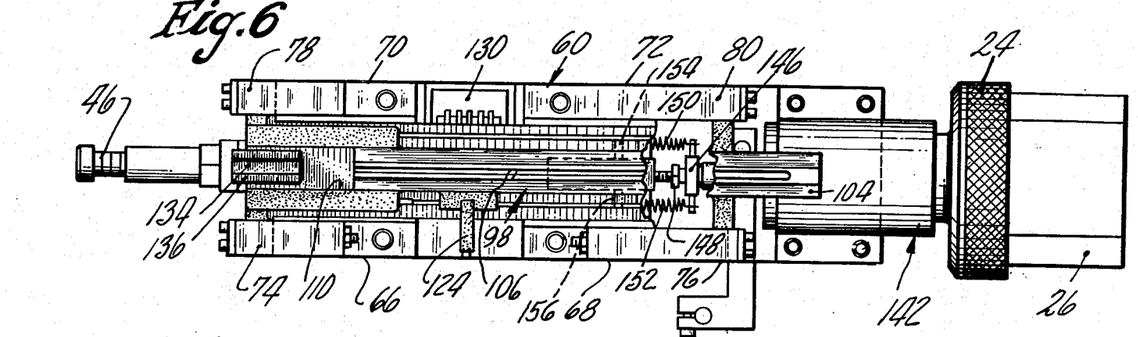
FIG. 6 is a top plan view of the measuring assembly, with the gaging fingers removed, taken substantially along the line 6—6 of FIG. 5.

The gaging assembly, generally indicated at 56, is best illustrated in the perspective view of FIG. 4 and FIGS. 5-8. Upon a frame, comprising a vertically adjustable support 58 and a base 60 fixedly mounted thereupon, the gaging assembly is carried. The base 60 is formed such that it has a laterally extending channel 62 and a centrally disposed channel 64 extending transversely thereto in intersecting relationship. The base 60 is the heart of the gaging assembly since it serves to carry all of the principal components thereof. The channels 62 and 64 define four walls 66, 68, 70 and 72 having respective lateral extensions 74, 76, 78, and 80, as is best shown in FIGS. 5 and 6.

To the ends of the extensions 74, 76, 78, and 80 are respectively secured downwardly depending reeds 82, 84, 86, and 88 as depicted in FIGS. 4, 5, and 8. The lower ends of the reeds 82, 84, 86, and 88 are respectively connected to the legs 90, 92, 94, and 96 of an elongated platform 98. The platform 98 is, hence, capable of lateral floating movement without a tendency to twist. The floating movement is limited by stops 100 and 102 (FIG. 5) which are adapted to engage the legs 90 and 92. The stops 100 and 102 may be constituted by bolts mounted in the walls 66 and 68 of the base 60 as is illustrated. The platform 98 incorporates an integral upper track portion 104 having a laterally extending groove 106. The finger 22 may be positioned within this groove and locked in any position therealong by means a bolt 108, as is explained more fully hereinafter.

Referring to FIGS. 5, 6, and 8, a part of the platform 98 is bifurcated so as to form an upwardly extending opening 110 with a web 112 joining the bifurcations at the left end of the platform. Against the web 112 is seated a compression spring 114, the compressive force of which is determined by the adjustment of the gage pressure control 46. The gage pressure control itself merely consists of a threaded member 116 in engagement with a nut 118 disposed in a housing 120 attached to the base 60 by bolts 122. When the gage is not in use, the spring 114 urges leg 90 against the stop 100, wherein the platform occupies its extreme lateral right position.

An armature 124 is attached to the front of the platform for varying the inductance of juxtaposed coils 126 and 128 which are mounted upon the base 60 at the bottom of channel 64. The armature is U-shaped and acts to close the magnetic circuit followed by the flux generated by each of the coils. The coils are connected to a base-mounted terminal 130 (FIG. 6) which, in turn, is connected to analog meter 40, as depicted in detail in FIG. 9. The armature and coils are, of course, part of a transducer which converts mechanical movement to an analog electrical signal proportional thereto.

With continued reference to FIG. 4, it will be seen that the finger 20 is fixedly mounted by means of a bolt upon a carriage 132 within a groove 134 (FIG. 6) in the raised rear portion 136 thereof such that both fingers are at the same level. The raised portion 136 of the carriage 132 projects upwardly through the opening 110 in the platform 98. As best observed in FIGS. 5 and 7, the carriage 132 is mounted upon the base 60 for axial sliding movement with respect thereto in lateral directions by oppositely arranged ball slides 138 and 140. Each slide is of conventional construction and consists of two ways with respective confronting V-shaped slots having balls with retainers therein. Movement of the carriage 132 in either lateral direction, of course, moves the finger carried thereupon a corresponding amount. It will be noted that, in FIG. 5, the fingers 20 and 22 of FIGS. 1-4 have been replaced by a new set of fingers 20' and 22' adapted to measure minor pitch diameters, as will be more fully explained hereinafter.

Movement of the carriage 132 is beget by a precision drive in the form of a precision screw assembly, generally shown at 142, actuated by turning the wheel 24. The precision screw assembly is mounted on the support 58. In essence, the spindle 144 pushes and pulls the carriage 132 at different locations thereupon. With reference particularly to FIGS. 4, 5, and 6, a yoke 146, extending transversely of the spindle axis and secured to the spindle by set screws (not shown), has its respective extremities hooked to the right ends of springs 150 and 152. The other ends of the springs 150 and 152 are respectively hooked to pins 154 and 156 mounted in and extending from the rear portion of the carriage 132. The springs 150 and 152 urge the head of a bolt 148 in threaded engagement with the carriage into firm contact with the end of the spindle. Hence, the spindle 144 pushes the carriage 132 to the left and the springs 150 and 152 pull the carriage to the right. The provision of such a connective arrangement avoids alignment problems between the spindle and the carriage.

Figure 9:
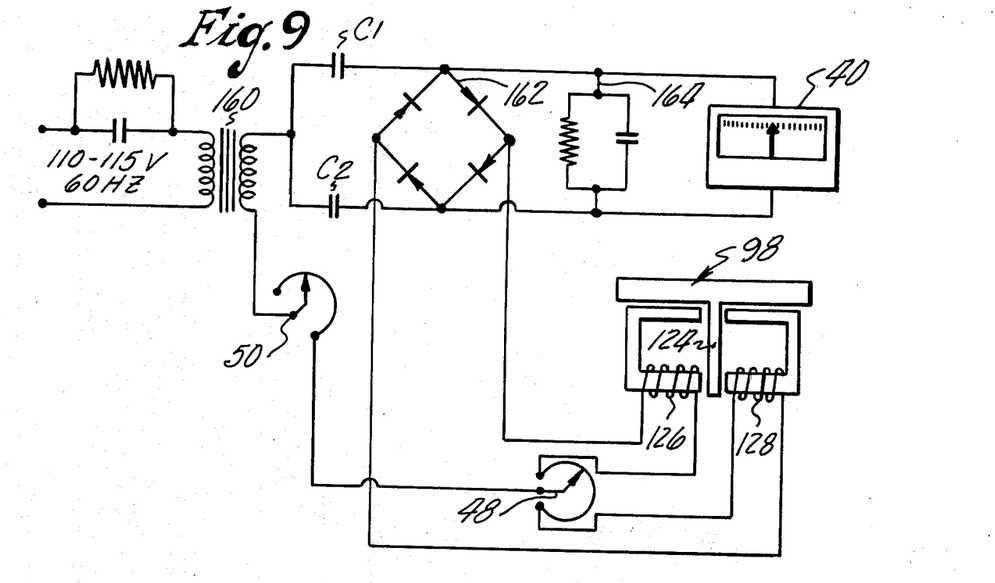
FIG. 9 is a schematic view of a preferred form of electronic measuring circuit for detecting the reference position of the platform.

The transducer circuit which senses displacement of the platform 98 with respect to the base 60, is shown in FIG. 9. The circuit, which is well known in the prior art, receives power from a transformer 160 connected to an AC source of power. One of the transformer terminals is connected to a bridge circuit comprising parallel capacitors $C_1$ and $C_2$, a diode bridge 162 and an RC filter 164. The bridge circuit is connected to the analog meter 40. The terminals of each coil are connected to the diode bridge 162 and the variable resistor of the zero control 48. The other terminal of the transformer 160 is connected to the zero control 48 via the variable resistor of the magnification control 50, the latter being a factory preset control.

Figures 7, 10:
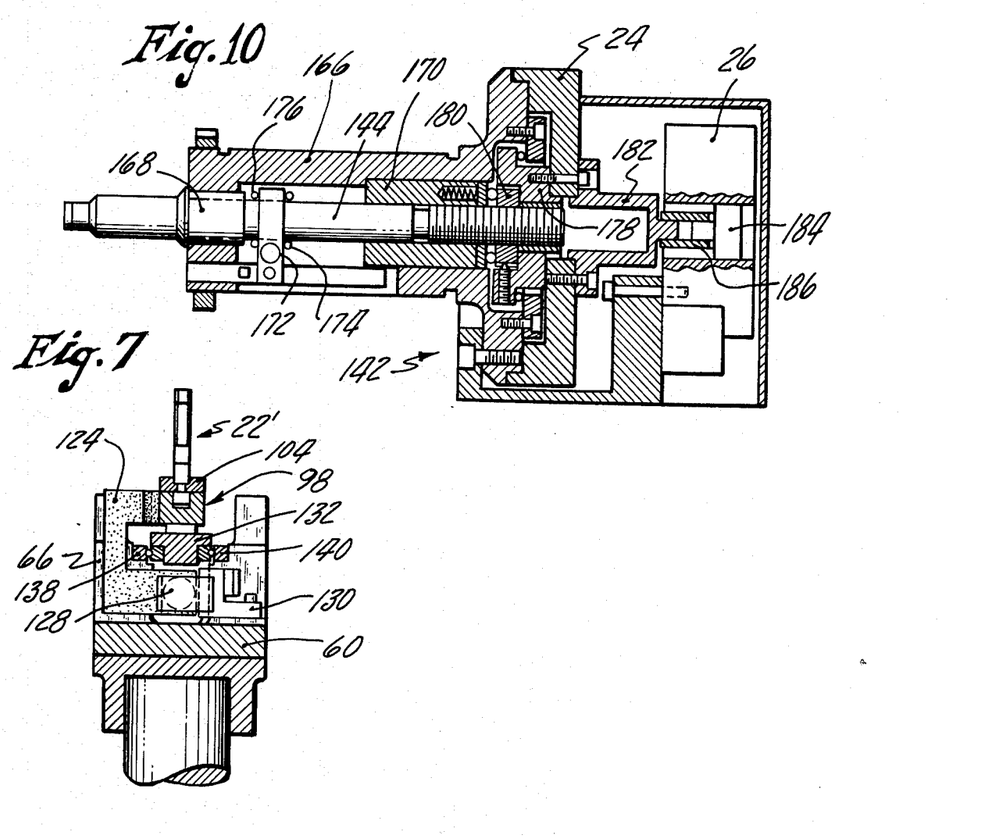
FIG. 10 is a partial sectional view of the precision screw assembly and shaft encoder.

The precision screw assembly of FIG. 10 is conventional and has been in use for many years in precision measuring equipment. The spindle 144 turns and advances within a housing 166 within bushings 168 and 170. Intermediate the bushings 168 and 170, a lead compensator 172 having O-rings 174 and 176 engages an unthreaded region of the spindle 144. The wheel 24 functions to rotate a primary nut assembly 178, which is constituted by a bronze nut in a steel housing, about the threaded portion of the spindle 144. In addition, a spring loaded antibacklash nut 180 surrounds the threaded portion of the spindle 144. The encoder 26 is rotated by a shaft 182 integral with the wheel 24 which is connected to the encoder's keyed shaft 184 by means of flex coupling 186.

Figure 11:
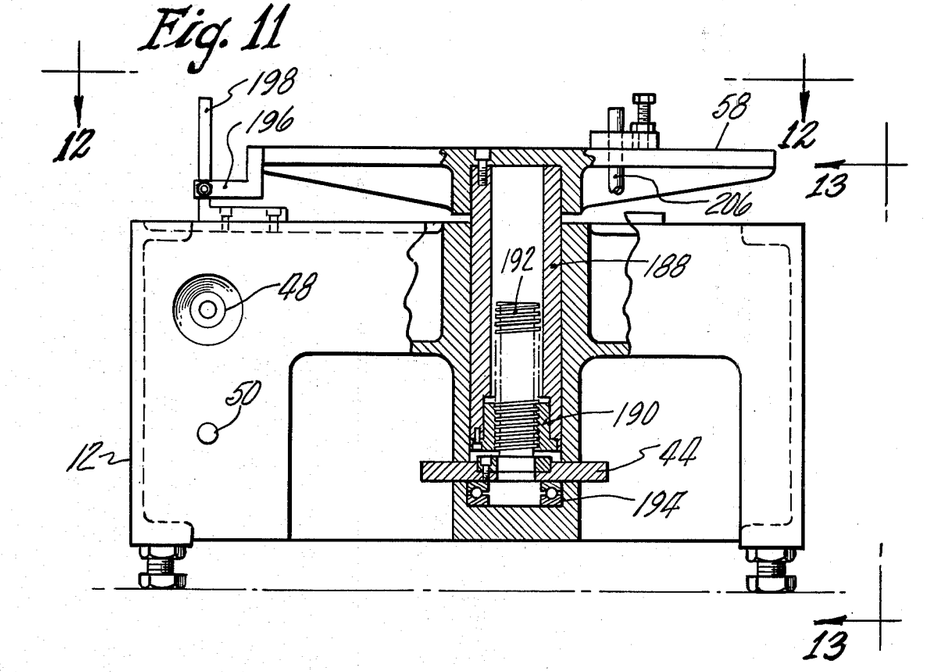
FIG. 11 is a front elevational view of the elevating mechanism for the measuring assembly support and its relationship to the lower gage casing.
Figure 12:
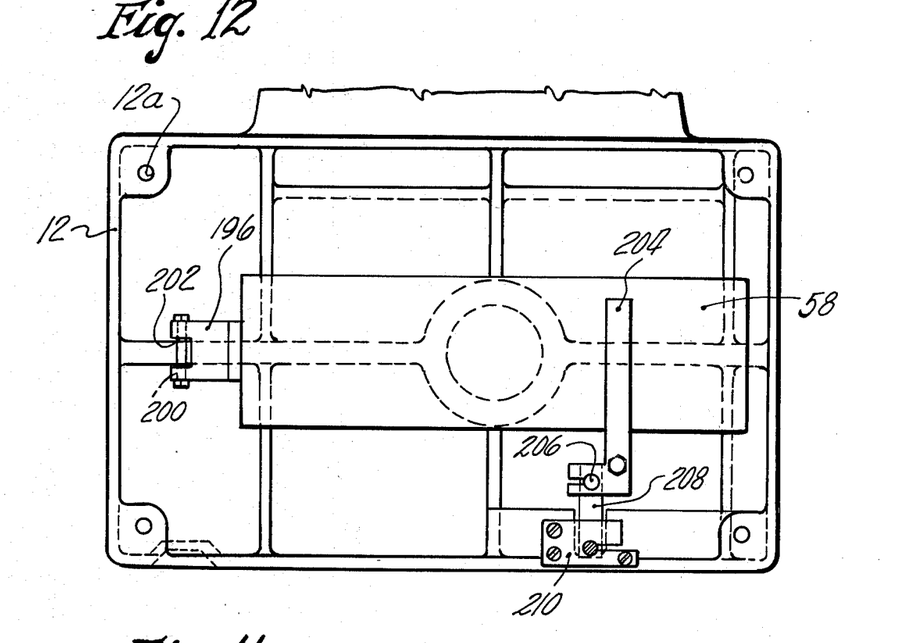
FIGS. 12 and 13 are respectively top plan views and side elevational views of the lower gage casing and elevating mechanism, taken along the lines 12—12 and 13—13 of FIG. 11.
Figure 13:
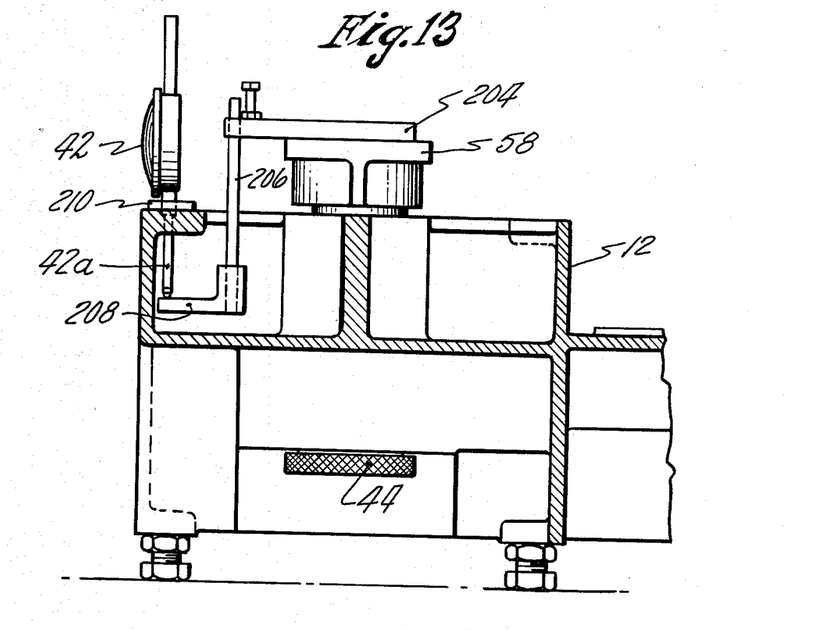

The elevating mechanism for the support 58, illustrated in FIGS. 11-13, is contained in its entirety in the lower casing 12 which is secured to the upper casing by bolts inserted in tapped holes 12a. The support 58, upon which the base 60 and the precision screw assembly 142 are mounted, is positioned atop a vertically movable column 188. A nut 190 is fixedly mounted in the base of column 188 in threaded engagement with a threaded shaft 192 connected to the vertical adjustment wheel 44. A thrust bearing 194, at the bottom of the cavity in the casing which contains the column 188, urges wheel 44 and, hence, shaft 192 upwardly to preclude any backlash. In order to forestall any rotation in the support during upward or downward movement, a bracket 196 on the support 58 slides over a guide post 198 bolted to the lower casing 12. A spring loaded plunger 200 on one side of the bracket maintains a bronze shoe 202 on the other side thereof in firm contact with the guide 198.

A plate 204, which is attached (by means not shown) to the surface of the support 58, is connected in an adjustable manner to a vertical post 206. The post 206 is connected to a foot 208 which engages the spring loaded probe 42a of the dial indicator 42, the indicator being fixedly attached to the lower casing by mounting bracket 210. Reference to the dial indicator 42 will yield a reading indicative of the support's vertical positions.

Figures 14, 14A, 14B, 15:
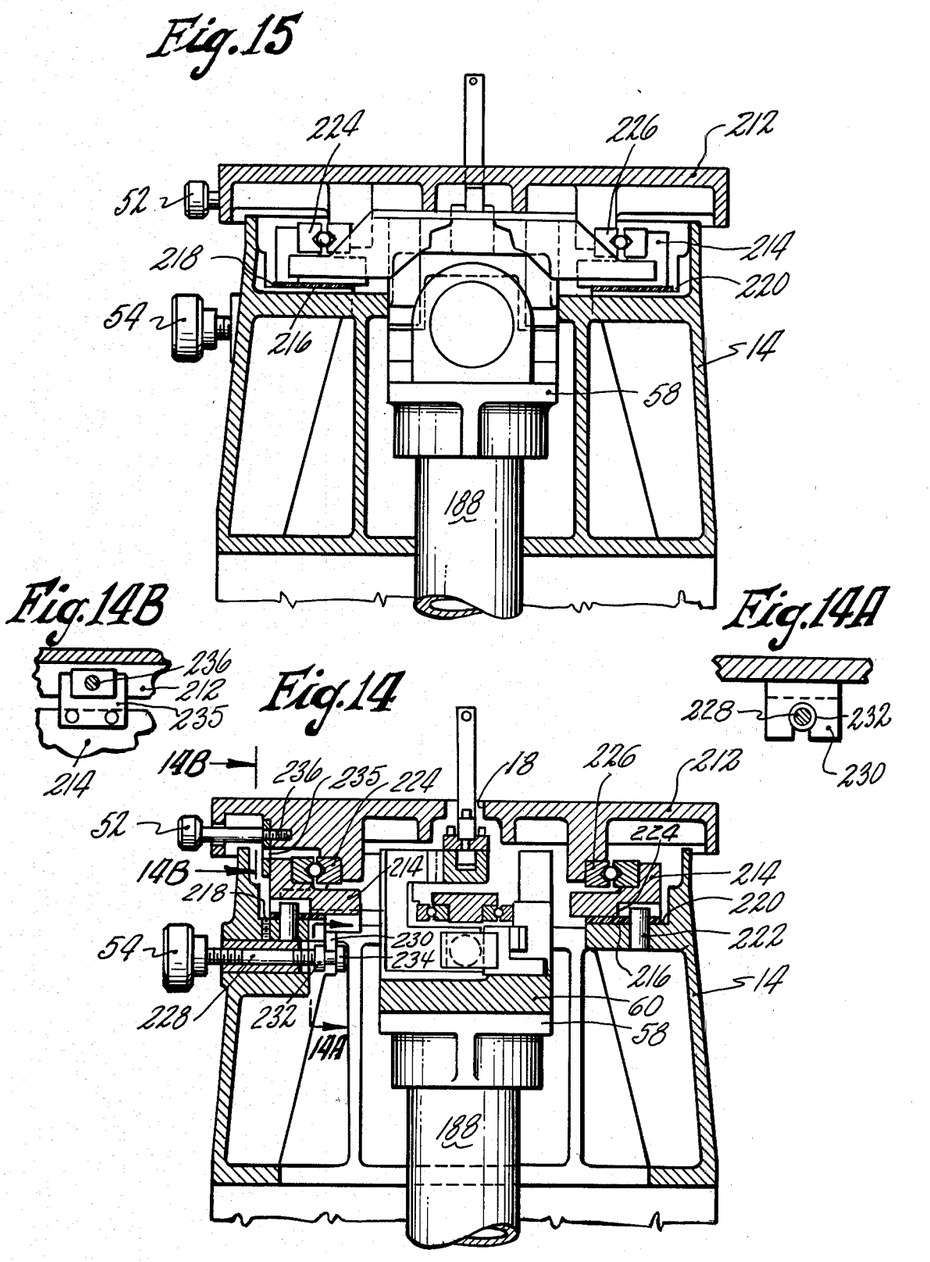
FIG. 14 is a sectional side elevational view, taken through the center of the upper casing, showing the work table positioning structure.
FIG. 14A is a view of the element which interconnects the work table and the adjusting device to enable bidirectional table movement toward the front or rear, taken along the line 14A—14A of FIG. 14.
FIG. 14B is a view of the lock which prevents sidewise floating of the work table, taken along the line 14B—14B of FIG. 14.
FIG. 15 is a view similar to that of FIG. 14, taken adjacent the right side of the upper gage casing.

The construction of the work table 16 may be understood by reference to FIGS. 4, 14, 14A, 14B, and 15. The work table has two principal components, viz.: the table top 212 and table support 214. As shown in FIG. 14, the work table is carried by the upper casing 14. More specifically, table support 214 rests upon four bearing pads 216, made of a lubricous material mounted upon shelves 218 and 220 formed in the upper casing 14. A guide pin 222 in the upper casing 14 in the rear of the gage is received within a recess 224 in the table support. A similar guide pin and recess are provided in the front of the gage. The guide pins and recesses prevent lateral motion of the table support in the lateral directions (indicated by arrow X in FIG. 1) but permit forward and rearward movement of the table support 214 (in the directions shown by arrow Y in FIG. 1). The table top 212 and the table support 214 are interconnected by laterally extending ball slides 224 and 226 which are similar to those in the gaging assembly.

The ball slides 224 and 226 permit the table top to be positioned laterally with respect to the gaging assembly (and also table support 214 and upper casing 14) since the table support 214 is restrained against lateral motion. However, the table top 212 and the table support 214 may move in unison between front and rear positions because the undersurface of the table support is adapted to slide over the pads 216.

Such sliding between front and rear positions is occasioned by turning the table adjustment knob 54, the shaft 228 of which has a depending yoke 230, attached to the table support 214, extending thereover. Retainers 232 and 234 on the shaft 228 define the position of the yoke with respect to the shaft 228. By turning the table lock knob 52, a thin reed 235 secured to the table support 214 is engaged by a plate mounted on a reduced diameter threaded portion 236 of the knob 52 and urged against the table top 212 whereby relative motion is prevented. Normally reed 235 bends away from the table top so as not to impede its motion.

Figures 16, 17, 18, 19, 20, 21:
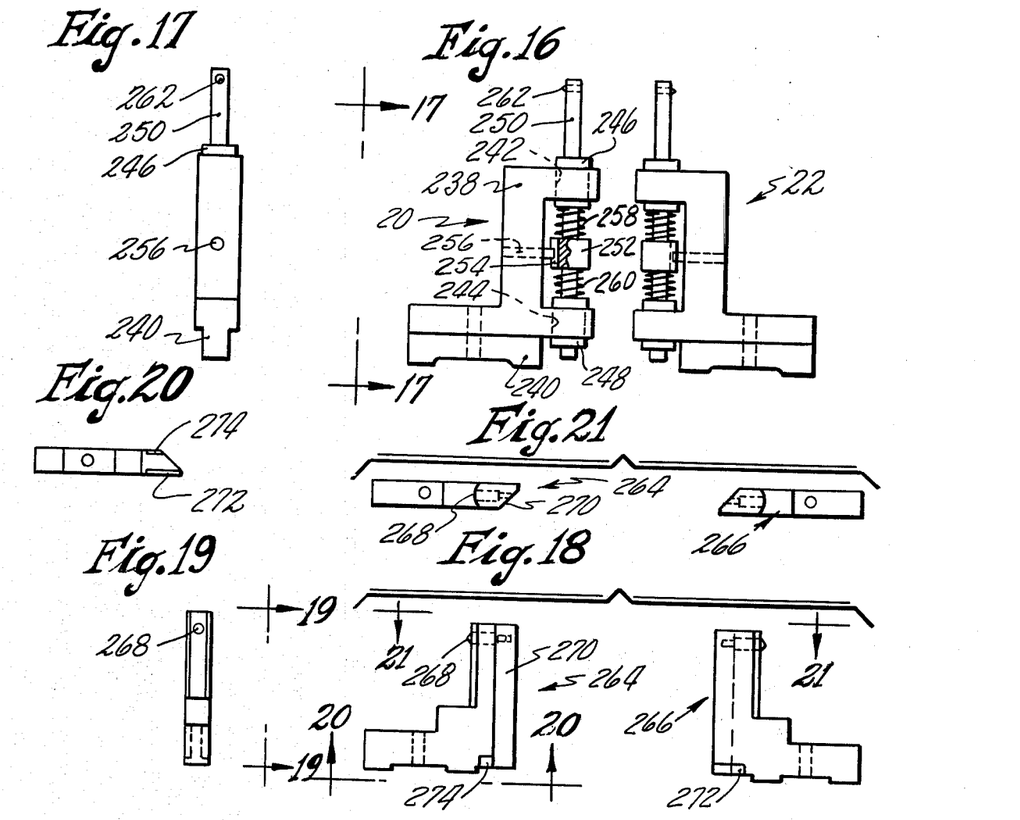
FIG. 16 is a front elevational view of the gaging fingers which are adapted to measure internal pitch diameters.
FIG. 17 is a side elevational view of a gaging finger taken along the line 17—17 of FIG. 16.
FIG. 18 is a front elevational view of another set of gaging fingers.
FIG. 19 is a side elevational view of a gaging finger of FIG. 18, taken along the line 19—19 of FIG. 18.
FIG. 20 is a bottom plan view of a gaging finger, taken along the line 20—20 of FIG. 18.
FIG. 21 is a top plan view of the gaging fingers of FIG. 18, taken along the line 21—21 thereof.

The gaging fingers 20 and 22 are shown in detail in FIGS. 16 and 17. Gaging fingers 20 and 22, which are identical, are special fingers in that they are adapted to measure only pitch diameters. Gaging finger 20 has an L-shaped bracket 238 with a reduced base portion 240 adapted to fit within the groove of either the platform or the carriage. The bracket 238 embodies vertically aligned bores 242 and 244 which are provided with press fitted bronze bushings 246 and 248 to facilitate the free sliding of a cylindrical probe 250. The probe 250 has a cylindrical member 252 fixedly secured by set screws (not shown) to a central location thereupon. The member 252 has a vertical keyway or slot 254 therein, in which is received the head of a pin 256. With the pin 256 in the slot 254, vertical movement is unrestricted but the probe 250 is restrained against rotation. The cylindrical member 252 also functions as a seat for springs 258 and 260 which have their other ends respectively seated against the upper and lower bushings 246 and 248. The springs impart a vertical floating capability to the probe 250. A horizontally projecting tip 262, adapted to fit between the flanks of the thread at the pitch diameter is provided at the upper extremity of the probe 250. It is essential that the springs 258 and 260 not be so strong as to lift a threaded part off the table top when engaged between the thread flanks; their function is only to permit floating of the probe 250.

It will be appreciated that the shape of the tips of the fingers 20 and 22 would be different for measuring major diameters and that for pitch diameters the size of the tips 262 will vary with thread size.

For minor diameters, such a set of fingers (20' and 22') is depicted in FIGS. 5, 7, and 8. The fingers 20' and 22' are devoid of floating elements and merely incorporate tubular carbide inserts 263 brazed into grooves in the upper outboard portions thereof. The carbide inserts are of a height sufficient to embrace a double thread width.

Another set of identical gaging fingers 264 and 266, which are similar in shape to 20' and 22', are illustrated in FIGS. 18–21. In contrast to the previously described fingers, fingers 264 and 266 are employed to measure internal dimensions (e.g., a bore diameter) of parts having smooth surfaces. Finger 264 has a hemispherical tip 268 to engage the wall of a part and has an inboard surface 270 which extends at an angle to the direction of movement to enable its opposing finger 266 to occupy a slightly overlapping relationship when measuring a small dimension. In addition, clearance cuts 272 and 274 may be needed to avoid interference with the structure upon which the finger is mounted.

In general, the particular design of the gaging fingers is mandated by the selected application. Special parts may require specially shaped fingers. Hence, it will be appreciated that the invention is not to be limited to only those fingers illustrated.

OPERATION

The operation of the heretofore described gage will be described with reference to ascertaining the pitch diameter of a part, it being understood that a gage of the invention can find utility in measuring many other internal dimensions. In addition, it should be evident that the gage can be operated other than as hereinafter described.

After the desired gaging pressure has been set by means of the gage pressure adjustment 46, the wheel 24 is turned counterclockwise until a slight pressure (caused by stopping against O-ring 174 in the precision screw assembly) is detected. The wheel 24 is then placed in a zero or reference position (by turning it clockwise), although this is not at all critical.

Next, the position of finger 22 must be adjusted, the position of finger 20 relative to the carriage normally never being shifted. Finger 22 is moved along the groove 106 until it contacts the master, which also engages finger 20. The finger 22 is then locked relative to the platform 98 by tightening the locking screw 108 with a wrench. It should be mentioned that the master could be constituted by outside caliper jaws set by one or more (i.e., a stack) of precision gage blocks. Of course, tie rods or other master units could also be employed.

The wheel 24 is then turned until the analog meter 40 reads zero. By zeroing the meter 40, the platform 98 and, hence, the finger 22 is moved to a reference position. The dimension set with the master is now entered in the digital display by means of the preset switches 36 and the preset button 34. The master is then removed and a part may be measured.

The part is then placed on the table over the fingers and the table may be unlocked by turning table lock 52. The wheel 24 is then turned until a deflection of the meter 40 is noted. With the gaging fingers 20 and 22 contacting the part to be measured, table adjustment knob 54 is positioned (or the part itself moved in the Y direction, as shown in FIG. 1) until the analog meter 40 yields it maximum positive (i.e., largest reading). This latter step insures that the maximum diameter of the part will be measured.

Finally, the wheel 24 is turned until the analog meter 40 reads zero. The number in the digital display is then the measured dimension, that is, the pitch diameter.

Measurements less than the range of travel of the precision screw assembly (e.g., less than one inch) are made in a similar manner but require initially turning the wheel 24 to an extreme clockwise position and utilizing a one inch master.

It will be seen that a gage of the invention could be operated as a comparator. In order to set up the gage for this mode of operation, the gage fingers should be set to the nearest inch by a master as heretofore described. The inch value of the master is then loaded into the digital display and the wheel 24 advanced until the exact dimension to be checked is displayed. The gage is now ready for comparison checks by reading the analog meter 40. In this mode of operation, the finger 20 on the carriage establishes the reference and the finger 22 on the platform senses the deviation therefrom.

Obviously, many modifications and variations are possible in light of the above teachings without departing from the scope or spirit of the invention as defined in the appended claims:

We claim:
1. In an internal gage having a frame, the combination comprising:
    a platform;
    a plurality of reeds securing the platform to the frame;
    a carriage mounted upon the frame in spaced relationship to the platform for axial sliding movement thereupon;
    a precision screw assembly mounted upon the frame in engagement with the carriage for moving the carriage;
    a position transducer for sensing the position of the platform relative to the frame;
    an incremental position transducer operatively connected to the precision screw assembly;
    a first gaging finger mounted upon the platform; and
    a second gaging finger mounted upon the carriage such that movement of the carriage in a direction away from the precision screw assembly causes a greater separation between the fingers.
2. The combination of claim 1, wherein the platform and the carriage are in vertical spaced relationship.
3. The combination of claim 2, wherein the reeds depend from the frame and wherein the platform comprises:
    a plurality of depending legs respectively secured to the reeds; and wherein there is further provided:
    spring means to bias the platform in a selected direction.
4. The combination of claim 1, wherein each of the fingers comprises:
    a bracket;
    a probe mounted in the bracket for vertical movement with respect thereto;
    spring means to urge the probe to a neutral position with respect to the bracket when displaced in either direction therefrom; and
    a tip on the probe adapted to fit between the crests of threads on a part to be measured.

* * * * *